United States Patent
Gibson et al.

(10) Patent No.: US 9,890,054 B2
(45) Date of Patent: Feb. 13, 2018

(54) PROCESS FOR PRODUCING A STABILIZED MAGNESIUM HYDROXIDE SLURRY

(71) Applicant: Martin Marietta Magnesia Specialties, LLC, Raleigh, NC (US)

(72) Inventors: Aileen Gibson, Owings Mills, MD (US); Lemuel Granada, Jr., Manistee, MI (US); Mark Wajer, Nottingham, MD (US)

(73) Assignee: Martin Marietta Magnesia Specialties, LLC, Raleigh, NC (US)

( * ) Notice: Subject to any disclaimer, the term of this patent is extended or adjusted under 35 U.S.C. 154(b) by 0 days.

(21) Appl. No.: 15/015,332

(22) Filed: Feb. 4, 2016

(65) Prior Publication Data

US 2017/0225961 A1  Aug. 10, 2017

(51) Int. Cl.
C01F 5/14 (2006.01)
C09K 15/04 (2006.01)
C09K 15/06 (2006.01)

(52) U.S. Cl.
CPC .............. *C01F 5/14* (2013.01); *C09K 15/04* (2013.01); *C09K 15/06* (2013.01)

(58) Field of Classification Search
CPC ............ C01F 5/14; C09K 15/04; C09K 15/06
See application file for complete search history.

(56) References Cited

U.S. PATENT DOCUMENTS

| | | | |
|---|---|---|---|
| 4,412,844 A | 11/1983 | Collins et al. | |
| 4,468,381 A | 8/1984 | Mitra et al. | |
| 5,169,894 A * | 12/1992 | Holland | B01F 17/0092 524/376 |
| 5,788,885 A | 8/1998 | Pomrink et al. | |
| 5,877,247 A * | 3/1999 | Mahar | A61K 8/19 106/471 |
| 5,906,804 A * | 5/1999 | Aral | C01F 5/14 423/265 |
| 8,314,170 B2 | 11/2012 | Dietrich et al. | |
| 8,394,191 B2 | 3/2013 | Bury | |
| 2006/0030643 A1 | 2/2006 | Bury et al. | |

FOREIGN PATENT DOCUMENTS

| | | |
|---|---|---|
| WO | 2001/096239 | 12/2001 |
| WO | 2014/154601 | 10/2014 |

OTHER PUBLICATIONS

"For Chrome Removal—Case Study: FloMag HP vs. Caustic and Alum," FMag HP Tech Bulletin, Martin Marietta, Aug. 1998.
"For Multiple Heavy Metals Removal—Case Study: FloMag HP vs. Lime, Caustic, and Alum," FMag HP Tech Bulletin, Martin Marietta, Dec. 1997.

(Continued)

*Primary Examiner* — Anthony J Zimmer
(74) *Attorney, Agent, or Firm* — Barnes & Thornburg LLP

(57) ABSTRACT

The present disclosure provides stable magnesium hydroxide slurry compositions and methods for producing stable magnesium hydroxide slurry compositions. The stable magnesium hydroxide slurries of the disclosure comprise magnesium hydroxide at about 50 to about 70% solids by weight in the slurry, a viscosity of less than about 1000 centipoise, and a 7-day pour test of 90% or greater.

19 Claims, 1 Drawing Sheet

(56) References Cited

OTHER PUBLICATIONS

"Magnesium Hydroxide Slurry Benefits in Municipal Wastewater Systems," Thioguard Technical Bulletin, Martin Marietta, Jun. 2011.
Higgins et al., "For Your Floc's Sake: Choosing Alternatives to Sodium Based Chemicals," WEFTEC 2000, 14 pgs.
Leykauf, "Magnesium Hydroxide As an Alternative to Caustic Sodium for Alkalinity Adjustment," Industrial Waterworld, Jul./Aug. 2008, p. 30.

* cited by examiner

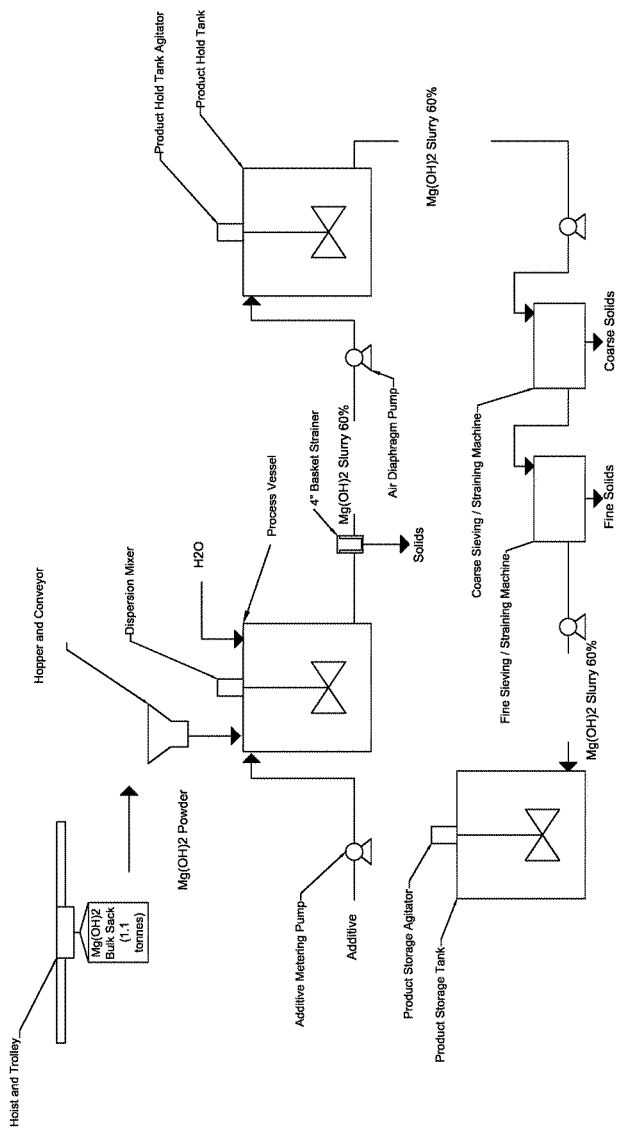

PROCESS FOR PRODUCING A STABILIZED MAGNESIUM HYDROXIDE SLURRY

TECHNICAL FIELD

The invention relates to compositions of a stable magnesium hydroxide slurry and processes for producing stable magnesium hydroxide slurries. The invention provides a magnesium hydroxide slurry that has a high percentage of solids, a desirable viscosity property, and is stable over an extended period of time.

BACKGROUND AND SUMMARY OF THE INVENTION

Magnesium hydroxide ($Mg(OH)_2$) is used as a source for both magnesium and hydroxyl ions in a wide range of important functional activities. Everyday applications that rely on the use of magnesium hydroxide include, for example, acid neutralization and heavy metal precipitation of waste water and process water, pulp bleaching, flue gas desulfurization, slag treatment in electrical power boilers, and prevention of sewage pipe corrosion.

The most convenient form for applications of magnesium hydroxide is its use as an aqueous suspension or slurry. In recent years, magnesium hydroxide slurry has increasingly been used to replace caustic soda solutions and lime slurries, both of which can cause undesirable effects on products and in the environment. Although magnesium hydroxide powder has poor flow properties and is difficult to accurately meter into treatment systems, the magnesium hydroxide slurry produced can be readily pumped into agitated storage tanks from a railcar or truck, or can even be metered directly into the treatment system at a controlled rate.

However, multiple problems may arise with the production and shipping of magnesium hydroxide slurries. First, magnesium hydroxide slurries typically contain 35% to 42% of water by weight. These large volumes of water are extremely expensive to ship over long distances. Second, since magnesium hydroxide slurries are generally dispersions of magnesium hydroxide solids in water, the magnesium hydroxide particles will eventually settle in the slurry over time according to the principles of Stokes' law. Over longer shipping distances and lengthier shipping times, there is a greater likelihood that settling of magnesium hydroxide will occur in the slurries. For example, magnesium hydroxide slurries that are shipped via railcars may take up to two weeks to arrive at the desired destination, and the slurries may be stored unused for an additional two to four weeks. Thus, it is important to ensure that the majority of solids in the magnesium hydroxide slurries stay in suspension for at least six weeks in order to provide a stable product.

Moreover, given the duration of storage time, international shipping of magnesium hydroxide slurries (for example, from the United States to Europe or Asia) may require longer than 2 or 3 months. Although specialized containers such as ISO tanks can potentially be utilized to transport magnesium hydroxide slurries overseas, these shipping methods are extremely cost prohibitive.

Previously, magnesium oxide (MgO) powder has been shipped to remote locations and then slaked in order to form magnesium hydroxide slurries. However, there are several disadvantages with this common approach. First, the slaking reaction necessary to create the magnesium hydroxide slurries is very exothermic. Assuming that no heat loss occurs during the reaction, preparing a mixture of 28% MgO by weight and 72% water by weight using a slaking reaction will generate enough heat to cause the resultant slurry to boil, which can cause injury and handling problems. Furthermore, the resultant mixture would only yield a magnesium hydroxide slurry containing about 40% magnesium hydroxide by weight. Although this issue can potentially be addressed by using a pressure reactor for slaking, these means are expensive and require the cooling of water in order to maintain safe working conditions. In addition, pressure reactors also require a government permit in order to operate.

In general, concentrated slurries containing approximately 60% magnesium hydroxide by weight are more stable than dilute slurries due to "hindered settling" or "crowded system" effects. However, in most instances, adding magnesium hydroxide powder to water may produce a slurry with a low solids concentration of approximately 30% to 40% solids due to high slurry viscosities at the higher solids loading. Moreover, although slurries produced with magnesium hydroxide powder at this lower solids concentration may have adequate pumping viscosities, the stability of the resultant slurries is quite poor.

Therefore, there continues to be a need for magnesium hydroxide slurries with a higher concentration of solids, a desirable viscosity for ease of pumping, and an improved stability that are able to withstand longer durations of shipping and storage. Moreover, processes to produce such slurries are also highly desirable.

The present disclosure provides magnesium hydroxide slurry compositions and methods to produce the same that have desirable properties and related advantages compared to other slurries and processes known in the art. For example, the compositions and methods provided herein allow for magnesium hydroxide powder to be shipped to remote locations and then processed into a stable magnesium hydroxide slurry that contains high concentrations of solids yielding better freight economics. Furthermore, since magnesium hydroxide may be hydrated at the raw material manufacturing site, heat of hydration at the remote site is not generated. This advantage greatly simplifies the slurry formation process as compared to a magnesium oxide slaking process.

Furthermore, the compositions and methods provided in the present disclosure desirably possess a higher concentration of solids, an advantageous viscosity for ease of pumping the slurry, and an enhanced stability so that the slurry can be shipped and stored for extended durations.

BRIEF DESCRIPTION OF THE DRAWING

FIG. 1 shows a process flow diagram for a magnesium hydroxide powder blending facility. Magnesium hydroxide powder is conveyed to the process vessel while the dispersion mixer runs over the course of about 15 minutes to 2.5 hours. The dispersion mixer can be run for an additional 15 to 60 minutes to fully disperse the additive and powder to form a substantially uniform mixed slurry. The resulting viscosity of the slurry should be less than 1000 cps, preferably less than 600 cps. If the viscosity is above 1000 cps (or above 600 cps), the slurry can be mixed for an additional 30 to 60 minutes and the viscosity is then retested.

Various embodiments of the invention are described herein as follows. In one aspect, a stable magnesium hydroxide slurry is provided. The stable magnesium hydroxide slurry comprises i) magnesium hydroxide, ii) one or more additives, and iii) water, wherein magnesium hydroxide is present in the slurry at about 50 to about 70% solids by weight, wherein the slurry has a viscosity less than about 1000 centipoise (cps), and wherein the slurry has a 7-day pour test of 90% or greater.

In another aspect, a method of producing a stable magnesium hydroxide slurry is provided. The method of producing a stable magnesium hydroxide slurry comprises the steps of a) combining water and one or more additives to form a first mixture; b) processing the first mixture in a mixer; c) combining the first mixture with magnesium hydroxide to form a second mixture; and d) processing the second mixture in a mixer to form the stable magnesium hydroxide slurry, wherein magnesium hydroxide is present in the slurry at about 50 to about 70% solids by weight, wherein the slurry has a viscosity less than about 1000 centipoise (cps), and wherein the slurry has a 7-day pour test of 90% or greater.

In the present disclosure, a stable magnesium hydroxide slurry is provided. The stable magnesium hydroxide slurry comprises i) magnesium hydroxide, ii) one or more additives, and iii) water, wherein magnesium hydroxide is present in the slurry at about 50 to about 70% solids by weight, wherein the slurry has a viscosity less than about 1000 centipoise (cps), and wherein the slurry has a 7-day pour test of 90% or greater.

Viscosity of the magnesium hydroxide slurry can be measured by any method known to the skilled artisan. In one exemplary method, the viscosity of the magnesium hydroxide slurry can be measured as follows. A 500 ml sample of magnesium hydroxide slurry can be placed in a beaker and adjusted to 25° C. Viscosity can be measured on a Brookfield RV series viscometer instrument (Brookfield Engineering Labs., Inc., Middleboro, Mass.) utilizing a spindle model RV-3. The spindle can be allowed to run for 60 seconds at 100 RPM, after which the viscosity reading of the magnesium hydroxide slurry is recorded.

A "pour test" according to the present disclosure refers to an evaluation of the stability of the magnesium hydroxide slurry after a specified time period. The methods of performing a pour test, such as a 7-day pour test or a 14-day pour test, are known to the skilled artisan. In one exemplary method, a pour test of the magnesium hydroxide slurry can be performed as follows.

The pour test can be performed by first placing the magnesium hydroxide slurry into a tared bottle (e.g., Cole Parmer number EW-06050-05, which is 20.3 cm high×6.0 cm wide). The bottle can be filled slurry to its shoulder with slurry, and the weight of the bottle and slurry can be recorded. Thereafter, the bottle is set aside in order to stand undisturbed for seven (7) days.

After 7 days, the water split can be measured through the bottle and the value can be recorded. Then, the cap can be removed and the slurry can be poured into a beaker, draining the bottle for approximately 30 seconds. The bottle should not be shaken prior to this instance of pouring out slurry. The weight of the bottle can then be recorded and the amount of slurry poured out of the bottle can be calculated. Thereafter, the percentage slurry that poured out at this time period can be calculated, and referred to as the "7-day 1st pour out."

A glass rod can be then used to stir the remaining slurry in the bottle for one revolution around the bottle. The remaining slurry can then be poured out over approximately 30 seconds. The weight of the bottle can be recorded, and the amount of all slurry poured out for both pours can be determined as the second pour (aka the "7-day 2nd pour out"). The amount of each pour can be calculated as the pour weight of the slurry divided by the total weight of the slurry in the bottle, multiplied by 100.

The same concepts can be performed at other various time periods, for example at a 14-day time period and referred to as the "14-day 1st pour out" and the "14-day 2nd pour out."

In some embodiments, the additive is selected from the group consisting of polycarboxylate, polyether polycarboxylate, polyether polycarboxylate sodium salt, naphthalenesulfonic acid-formaldehyde-polycondensate, naphthalenesulfonic acid-formaldehyde-polycondensate sodium salt, polyacrylate copolymer, or an acrylic copolymer, or a combination thereof. In certain embodiments, the additive is polycarboxylate. In other embodiments, the additive is polyether polycarboxylate. In yet other embodiments, the additive is polyether polycarboxylate sodium salt. In some embodiments, the additive is naphthalenesulfonic acid-formaldehyde-polycondensate. In other embodiments, the additive is naphthalenesulfonic acid-formaldehyde-polycondensate as sodium salt. In yet other embodiments, the additive is polyacrylate copolymer. In some embodiments, the additive is an acrylic copolymer.

In certain embodiments, the additive is present in the slurry at about 0.001%-2.5% by weight, with the weight percentage based on the amount of dry magnesium hydroxide solids present in the slurry. In some embodiments, the additive is present in the slurry at about 0.01%-1.5% by weight (based on dry magnesium hydroxide solids). In yet other embodiments, the additive is present in the slurry at about 0.1%-1.0% by weight (based on dry magnesium hydroxide solids). In some embodiments, the additive is present in the slurry at about 0.60% by weight (based on dry magnesium hydroxide solids).

In certain embodiments, magnesium hydroxide is present in the slurry at about 55 to about 65% solids by weight. In other embodiments, magnesium hydroxide is present in the slurry at about 58 to about 65% solids by weight. In yet other embodiments, magnesium hydroxide is present in the slurry at about 60% solids by weight.

In various embodiments, the slurry has a viscosity less than about 900 cps. In some embodiments, the slurry has a viscosity less than about 800 cps. In other embodiments, the slurry has a viscosity less than about 700 cps. In yet other embodiments, the slurry has a viscosity less than about 600 cps.

In various embodiments, the slurry has a viscosity between about 900 cps to about 1000 cps. In other embodiments, the slurry has a viscosity between about 800 cps to about 900 cps. In yet other embodiments, the slurry has a viscosity between about 700 cps to about 800 cps. In some embodiments, the slurry has a viscosity between about 600 cps to about 700 cps.

In various embodiments, the slurry has a 7-day pour test of 92% or greater. In some embodiments, the slurry has a 7-day pour test of 95% or greater. In other embodiments, the slurry has a 14-day pour test of 80% or greater. In yet other embodiments, the slurry has a 14-day pour test of 85% or greater. In some embodiments, the slurry has a 14-day pour test of 90% or greater. In other embodiments, the slurry has a 14-day pour test of 95% or greater.

In some embodiments, the stable magnesium hydroxide slurry is substantially free of an alkali metal salt. In some embodiments, the water soluble alkali metal salt. In certain embodiments, the water soluble alkali metal salt is sodium citrate. In other embodiments, the water soluble alkali metal salt is $Na_2CO_3$ As used herein, the term "substantially free of an alkali metal salt" means that the stable magnesium hydroxide slurry comprises, at most, trace quantities of the alkali metal salt. In some embodiments, the stable magnesium hydroxide slurry comprises between about 0.1% to about 2% of the alkali metal salt. In other embodiments, the stable magnesium hydroxide slurry comprises less than 0.3% of the alkali metal salt. In yet other embodiments, the stable magnesium hydroxide slurry comprises less than 0.2% of the alkali metal salt.

In some embodiments, the stable magnesium hydroxide slurry is substantially free of boric acid. Boric acid has the formula $B(OH)_3$. In other embodiments, the stable magnesium hydroxide slurry is substantially free of water soluble salts of boric acid. Water soluble salts of boric acid include alkali metal salts of boric acid, as well as sodium tetraborate, otherwise known as Borax. As used herein, the term "substantially free of boric acid" or "substantially free of water soluble salts of boric acid" means that the stable magnesium hydroxide slurry comprises, at most, trace quantities of boric acid or of water soluble salts of boric acid. In some embodiments, the stable magnesium hydroxide slurry comprises from about 0.01% to about 5% of boric acid or of water soluble salts of boric acid. In other embodiments, the stable magnesium hydroxide slurry comprises less than 0.01% of boric acid or of water soluble salts of boric acid.

In another aspect, a method of producing a stable magnesium hydroxide slurry is provided. The method of producing a stable magnesium hydroxide slurry comprises the steps of a) combining water and one or more additives to form a first mixture; b) processing the first mixture in a mixer; c) combining the first mixture with magnesium hydroxide to form a second mixture; and d) processing the second mixture in a mixer to form the stable magnesium hydroxide slurry, wherein magnesium hydroxide is present in the slurry at about 50 to about 70% solids by weight, wherein the slurry has a viscosity less than about 1000 centipoise (cps), and wherein the slurry has a 7-day pour test of 90% or greater.

The various embodiments described with respect to the stable magnesium hydroxide slurry are also applicable to the method of producing a stable magnesium hydroxide slurry.

In some embodiments, step d) of the method of producing the stable magnesium hydroxide slurry is performed over a time of between about 1 hour to about 3 hours. In other embodiments, step d) of the method of producing the stable magnesium hydroxide slurry is performed over a time of between about 1 hour to about 2.5 hours.

In some embodiments, step c) of the method of producing the stable magnesium hydroxide slurry and step d) of the method of producing the stable magnesium hydroxide slurry are performed simultaneously. In certain embodiments wherein step c) and step d) are performed simultaneously, step d) of the method of producing the stable magnesium hydroxide slurry is performed over a time of between about 1 hour to about 3 hours. In other embodiments wherein step c) and step d) are performed simultaneously, step d) of the method of producing the stable magnesium hydroxide slurry is performed over a time of between about 1 hour to about 2.5 hours.

In certain embodiments, the mixer is a shear mixer. In some embodiments, the mixer is a paddle mixer. In other embodiments, the mixer is a high speed mixer. In yet other embodiments, the mixer is a disperser mixer. In various embodiments, the mixer of step b) and the mixer of step d) are the same.

In certain embodiments of the method of producing the stable magnesium hydroxide slurry, the method further comprises step e), wherein if the viscosity of the slurry is above 1000 cps, further processing the slurry until the viscosity of the slurry is less than 1000 cps. In some embodiments of the method of producing the stable magnesium hydroxide slurry, the method further comprises step e), wherein if the viscosity of the slurry is above 900 cps, further processing the slurry until the viscosity of the slurry is less than 900 cps. In other embodiments of the method of producing the stable magnesium hydroxide slurry, the method further comprises step e), wherein if the viscosity of the slurry is above 800 cps, further processing the slurry until the viscosity of the slurry is less than 800 cps. In yet other embodiments of the method of producing the stable magnesium hydroxide slurry, the method further comprises step e), wherein if the viscosity of the slurry is above 700 cps, further processing the slurry until the viscosity of the slurry is less than 700 cps. In other embodiments of the method of producing the stable magnesium hydroxide slurry, the method further comprises step e), wherein if the viscosity of the slurry is above 600 cps, further processing the slurry until the viscosity of the slurry is less than 600 cps. In various embodiments, the further processing occurs over a time between about 30 to 60 minutes. In one embodiment, the further processing occurs over a time of about 30 minutes. In one embodiment, the further processing occurs over a time of about 60 minutes.

In certain embodiments of the method of producing the stable magnesium hydroxide slurry, the method further comprises step f), wherein if the viscosity of the slurry is above 1000 cps, further combining additional additive to the slurry and further processing the slurry until the viscosity of the slurry is less than 1000 cps. In some embodiments of the method of producing the stable magnesium hydroxide slurry, the method further comprises step f), wherein if the viscosity of the slurry is above 900 cps, further combining additional additive to the slurry and further processing the slurry until the viscosity of the slurry is less than 900 cps. In other embodiments of the method of producing the stable magnesium hydroxide slurry, the method further comprises step f), wherein if the viscosity of the slurry is above 800 cps, further combining additional additive to the slurry and further processing the slurry until the viscosity of the slurry is less than 800 cps. In yet other embodiments of the method of producing the stable magnesium hydroxide slurry, the method further comprises step f), wherein if the viscosity of the slurry is above 700 cps, further combining additional additive to the slurry and further processing the slurry until the viscosity of the slurry is less than 700 cps. In some embodiments of the method of producing the stable magnesium hydroxide slurry, the method further comprises step f), wherein if the viscosity of the slurry is above 600 cps, further combining additional additive to the slurry and further processing the slurry until the viscosity of the slurry is less than 600 cps. In various embodiments, the further processing occurs over a time between about 30 to 60 minutes. In one embodiment, the further processing occurs over a time of about 30 minutes. In one embodiment, the further processing occurs over a time of about 60 minutes.

In various embodiments of the method of producing the stable magnesium hydroxide slurry, the method further comprises the step of pumping the slurry through a strainer to a hold tank. In some embodiments, the pumping occurs via an air diaphragm pump. In some aspects, the strainer is a basket strainer. In various embodiments, the hold tank is equipped with an agitation system. In other embodiments, the agitation system is a mechanical agitation system.

In various embodiments of the method of producing the stable magnesium hydroxide slurry, the method further comprises the step of pumping the slurry to remove course particles. In certain aspects, the pumping is performed using a second diaphragm pump. In various aspects, the pumping is directed to a coarse sieving machine. In some embodiments, the coarse sieving machine is 60 mesh. In other aspects, the pumping is directed to a straining machine. In some embodiments, the straining machine is 60 mesh.

In various embodiments of the method of producing the stable magnesium hydroxide slurry, the method further comprises the step of discharging the slurry to remove finer particles. In certain aspects, the discharging is directed to a fine sieving machine. In some embodiments, the fine sieving machine is 90 mesh. In other aspects, the discharging is directed to a straining machine. In some embodiments, the straining machine is 90 mesh.

In various embodiments of the method of producing the stable magnesium hydroxide slurry, the method further comprises the step of pumping the slurry to a finished product storage tank. In certain aspects, the finished product storage tank is equipped with an agitation system. In some embodiments, the agitation system is a mechanical agitation system.

In certain aspects, the magnesium hydroxide of step c) of the method provided herein is a magnesium hydroxide powder. Powder forms of magnesium hydroxide are well known in the art. In some embodiments, the magnesium hydroxide powder is a synthetic high purity product. For example, a synthetic high purity product can be made from a reaction between magnesium-rich brine and dolomitic lime. In some exemplary aspects, the synthetic high purity product can be FloMag® MHP or MagChem® MH 10 UF (Martin Marietta Magnesia Specialties, Manistee, Mich.).

In some aspects, the magnesium hydroxide power has a specified particle size. In certain embodiments, the particle size of the distribution of particle size in the magnesium hydroxide power can be determined and quantified. The median particle size distribution is referred to as the "D50" value. In yet other embodiments, the magnesium hydroxide powder has a distribution of particles having a D50 between about 0.1 to about 20 microns. In yet other embodiments, the magnesium hydroxide powder has a distribution of particles having a D50 between about 0.5 to about 10 microns. In yet other embodiments, the magnesium hydroxide powder has a distribution of particles having a D50 between about 0.8 to about 8 microns.

For example, particle size of the magnesium hydroxide powder can be measured using a SediGraph III particle size analyzer (MICROMERITICS®, Norcross, Ga.). Prior to testing, a sample of magnesium hydroxide slurry can be dried and ground through a 50 mesh screen (U.S. Standard). Thereafter, 3.0 grams of the dried magnesium hydroxide can be placed in a clean beaker with a stirring bar and 50 ml of A-11 SEDISPERSE (MICROMERITICS®, Norcross, Ga.) can be added. The sample can be stirred for several minutes, followed by placement of a 500 watt sonic probe in the sample. After the probe is run for about 30 seconds to about 11 minutes, the sample can be stirred for several more minutes and the probe can be run for about 30 more seconds to about 11 more minutes, ensuring that the sample is sufficiently suspended and ready to be tested on the particle size analyzer.

In some embodiments, the magnesium hydroxide powder has distribution of particles having a BET surface area between about 5 about to 30 $m^2/g$. In other embodiments, the magnesium hydroxide powder has distribution of particles having a BET surface area between about 5 about to 20 $m^2/g$. In yet other embodiments, the magnesium hydroxide powder has distribution of particles having a BET surface area between about 7 about to 18 $m^2/g$. As used herein, the term "BET surface area" refers to the surface area of magnesium hydroxide particles measured in units of $m^2/g$ and is calculated using the BET method of surface area determination using a TRISTAR instrument (MICROMERITICS®, Norcross, Ga.).

The present disclosure also includes a stable magnesium hydroxide slurry produced according to any one of the methods described herein.

While the invention is susceptible to various modifications and alternative forms, specific embodiments are herein described in detail. It should be understood, however, that there is no intent to limit the invention to the particular forms described, but on the contrary, the intention is to cover all modifications, equivalents, and alternatives falling within the scope of the invention.

EXAMPLE 1

Production of Magnesium Hydroxide Slurry

The instant example provides a procedure to produce approximately 8 liters of magnesium hydroxide slurry. For the instant example, a 5-gallon container equipped with a Hobart paddle blade mixer (low shear) or a Hockmeyer mixer (high shear) can be used to provide sufficient mixing of the slurry while avoiding spillage.

The following protocol using a Hobart low shear or a Hockmeyer high shear mixer can produce 8 liters of magnesium hydroxide slurry with approximately 60% solids.

1. Place 5,063 mL of water into Hobart with paddle blade mixer or Hockmeyer mixer.
2. To the water, add 44 grams of additive neat. Additives can include an acrylic copolymer or polyether polycarboxylate sodium salt (0.58% by weight based on $Mg(OH)_2$ solids) for FloMag® MHP. Alternatively, 78 mL of the additive (1.03% by weight based on $Mg(OH)_2$ solids) can be added for MagChem® MH 10 UF.
3. Mix the water and additive to disperse the additive within the mixture.
4. Once mixed, continue to run the mixer and add safely and slowly 7,632 grams of the FloMag® MHP or MagChem® MH 10 UF Magnesium Hydroxide Powder.
5. Mix for one hour or more, until the slurry is uniform and free of lumps.

In all mixing formats, the additive should be added to the mixture first. Addition of the additive after the powder generally results in high volumes of the additive in order to disperse the slurry and reduce it to a workable viscosity. In all cases, the addition of the magnesium hydroxide powder should be added slowly enough so that the powder wets in before adding more powder, or the powder feed rate must be low enough so that significant powder does not build up on the surface of the liquid.

With a smaller median diameter magnesium hydroxide powder such as MagChem® MH 10 UF (which has a D50 of 1.0 micron), a higher additive dosage should be used compared to a coarser magnesium hydroxide powder such as FloMag® MHP (with a D50 of 4 microns) in order to produce a stable slurry with a workable viscosity below 1000 cps, or preferably below 600 cps.

Table 1 shows that without an additive, producing magnesium hydroxide slurry with the 4 micron powder at 40% solids exhibited a high viscosity of 444 cps and high water split of 18 mm. Tacky settling occurred at the bottom of the container after 7 and 14 days, while slurry stability (at the first pour out) was 76% and 57%, respectively. By adding an additive (e.g., an acrylic copolymer or polyether polycarboxylate sodium salt), the $Mg(OH)_2$ solids in the slurry was increased to 60%, while viscosity stayed in a desirable range below 200 cps. For the 4 micron powder, low or high shear mixing did not have a significant impact on slurry stability, as both produced slurry with excellent 7- and 14-day pour outs of >90% and >85%, respectively.

TABLE 1

Stability of FloMag ® MHP (4 micron) Slurry
FloMag ® MHP Magnesium Hydroxide Powder

| Batch Volume | 3 liter | 8 liter | 8 liter |
|---|---|---|---|
| Type of Mixing | Low Shear | Low Shear | High Shear |
| Type of Additive | none | Acrylic Copolymer* | Acrylic Copolymer* |
| % by weight Additive Based on Mg(OH)$_2$ Solids | 0 | 0.58 | 0.58 |
| % by weight Mg(OH)$_2$ Solids | 40 | 60 | 60 |
| Viscosity, cps | 444 | 187 | 96 |
| 7-Day, Type of Settling on Bottom of Container | Soft/Tacky | Soft | Soft |
| 7-Day, Water Split, mm | 17 | 16 | 13 |
| 7-Day, 1st Pour Out, % | 76 | 94 | 91 |
| 7-Day, 2nd Pour Out, % | 87 | 97 | 98 |
| 7-Day, Viscosity, cps | 438 | 100 | 128 |
| 14-Day, Type of Settling on Bottom of Container | Soft/Tacky | soft | soft |
| 14-Day, Water Split, mm | 16 | 16 | 12 |
| 14-Day, 1st Pour Out, % | 57 | 89 | 89 |
| 14-Day, 2nd Pour Out, % | 80 | 97 | 98 |
| 14-Day, Viscosity, cps | 452 | 104 | 128 |

*Additive can also be a polyether polycarboxylate sodium salt

As shown in Table 2, producing magnesium hydroxide slurry with 1 micron powder at 30% solids provided similar results as shown with the 4 micron powder but at lower solids. At 30% solids, the viscosity of this slurry was over 500 cps. Since there was more water contained in the slurry, the 7-day pour out was marginally good at 89%. However, after 14 days, the pour out dropped significantly to 39%. A soft but tacky sediment was formed at the bottom of the container.

TABLE 2

Stability of MagChem ® MH 10 UF (1 micron) Slurry
MagChem ® MH 10 UF Magnesium Hydroxide Powder

| Batch Volume | 3 liter | 8 liter | 8 liter |
|---|---|---|---|
| Type of Mixing | Low Shear | Low Shear | High Shear |
| Type of Additive | none | Acrylic Copolymer* | Acrylic Copolymer* |
| % by weight Additive Based on Mg(OH)2 Solids | 0 | 1.03 | 1.03 |
| % by weight Mg(OH)2 Solids | 30 | 60 | 60 |
| Viscosity, cps | 539 | 421 | 259 |
| 7-Day, Type of Settling on Bottom of Container | Soft/Tacky | Soft | Soft |
| 7-Day, Water Split, mm | 18 | 3 | 6 |
| 7-Day, 1st Pour Out, % | 89 | 88 | 95 |
| 7-Day, 2nd Pour Out, % | 91 | 94 | 97 |
| 7-Day, Viscosity, cps | 529 | 347 | 180 |
| 14-Day, Type of Settling on Bottom of Container | Soft/Tacky | Soft | Soft |
| 14-Day, Water Split, mm | 36 | 7 | 6 |
| 14-Day, 1st Pour Out, % | 39 | 88 | 91 |
| 14-Day, 2nd Pour Out, % | 83 | 95 | 96 |
| 14-Day, Viscosity, cps | 535 | 348 | 189 |

*Additive can also be a polyether polycarboxylate sodium salt

By adding an additive (e.g., an acrylic copolymer or polyether polycarboxylate sodium salt) at a higher dosage of 1.03% by weight to the magnesium hydroxide slurry formed with 1 micron powder, the Mg(OH)$_2$ solids in the slurry increased to 60%, while viscosity stayed below 600 cps. With the finer magnesium hydroxide powder, there was a noticeable impact when using low shear mixing compared to using high shear mixing.

Using low shear mixing, the viscosity of the slurry was higher at 421 cps. The 7-day and 14-day pour outs were both marginal at 88% for the first pour out.

Using high shear mixing, the viscosity of the slurry was 259 cps and the 7- and 14-day pour outs were excellent at 95% and 91%, respectively. This indicated that high shear mixing produces a more stable slurry.

EXAMPLE 2

Production of Magnesium Hydroxide Slurry Using Additional Mixing

The instant example provides a procedure to produce magnesium hydroxide slurry if the desired slurry viscosity is not achieved after the initial dosage of the additive. For the instant example, additional additive and additional mixing time were provided to reduce the viscosity to less than 600 cps. This example provides an exemplary procedure using FloMag® MHP Magnesium Hydroxide Powder.

1. To produce 5 liters of stabilized, 60% solids magnesium hydroxide slurry, charge a process vessel equipped with a high shear dispersion mixer with 3.03 liters of water and 27.5 grams (0.6% by weight of Mg(OH)$_2$ solids) of an additive (e.g., acrylic copolymer or polyether polycarboxylate sodium salt (40% solution)). Start the mixer to fully combine the additive into the water.
2. If feasible, the preferred small scale set-up should include:
   a. A mixing vessel equipped with Hockmeyer top mixer
   b. Initial mixing speed—280 RPM (or until the vortex is nearly to the blade but not entraining air into the slurry)
   c. Mixing speed (RPM) will increase during the addition of magnesium hydroxide
   d. Mixing speed during blending—945 RPM (or until the vortex is nearly to the blade but not entraining air into the slurry)
3. While the dispersion mixer is running, slowly add 4.58 kilograms of FloMag® MHP. Magnesium hydroxide powder should preferably not be added all at one time, but instead added slowly to allow the magnesium hydroxide to wet in before more magnesium hydroxide is added. If too much magnesium hydroxide powder is added too quickly, the slurry viscosity will initially be high until all of the powder and additive are well mixed with the water.
4. After all of the magnesium hydroxide powder is added, allow the mixture to blend for an additional 60 minutes to fully mix the slurry. Run the mixer in order to not entrain air but fast enough to fully disperse the magnesium hydroxide powder and additive.
5. After 60 minutes of mixing, obtain a sample of slurry and test the viscosity of the slurry. The slurry should have a viscosity less than 1000 cps, preferably less than 600 cps.
6. If the slurry has a viscosity above 1000 cps (or alternatively above 600 cps), continue mixing the slurry for additional time (e.g., 60 minutes).
7. After the continued mixing, obtain another sample of slurry and test the viscosity of the slurry.
8. After the continued mixing, if the slurry viscosity is still above 1000 cps (or alternatively above 600 cps), then add 13.8 grams of polyether polycarboxylate sodium salt additive (40% solution) to the slurry and mix for another 60 minutes.
9. Test and record the viscosity of the final mix.
10. The final slurry should be passed through a strainer (e.g., a basket strainer) and then through a 60 mesh sieve to ensure agglomerated powder and slurry are removed.

What is claimed is:

1. A stable magnesium hydroxide slurry consisting essentially of: i) magnesium hydroxide, ii) one or more additives, and iii) water,
wherein the one or more additives is a polyether polycarboxylate sodium salt, an acrylic copolymer, or a combination thereof,
wherein magnesium hydroxide is present in the slurry at about 50 to about 70% solids by weight,
wherein the slurry has a viscosity less than about 1000 centipoise (cps), and
wherein the slurry has a 7-day pour test of 90% or greater, as measured by the 7-day 2nd pour out test.

2. The stable magnesium hydroxide slurry of claim 1, wherein the one or more additives is polyether polycarboxylate sodium salt.

3. The stable magnesium hydroxide slurry of claim 1, wherein the one or more additives is an acrylic copolymer.

4. The stable magnesium hydroxide slurry of claim 1, wherein the one or more additives is present in the slurry at about 0.001%-2.5% by weight (based on dry magnesium hydroxide solids).

5. The stable magnesium hydroxide slurry of claim 1, wherein the one or more additives is present in the slurry at about 0.60% by weight (based on dry magnesium hydroxide solids).

6. The stable magnesium hydroxide slurry of claim 1, wherein magnesium hydroxide is present in the slurry at about 58 to about 65% solids by weight.

7. The stable magnesium hydroxide slurry of claim 1, wherein the slurry has a viscosity less than about 600 cps.

8. The stable magnesium hydroxide slurry of claim 1, wherein the one or more additives consists essentially of a combination of polyether polycarboxylate sodium salt and an acrylic copolymer.

9. A method of producing the stable magnesium hydroxide slurry of claim 1, said method comprising the steps of:
a) combining water and one or more additives to form a first mixture, wherein the one or more additives is a polyether polycarboxylate sodium salt, an acrylic copolymer, or a combination thereof;
b) processing the first mixture in a mixer;
c) combining the first mixture with magnesium hydroxide to form a second mixture; and
d) processing the second mixture in a mixer to form the stable magnesium hydroxide slurry,
wherein magnesium hydroxide is present in the slurry at about 50 to about 70% solids by weight,
wherein the slurry has a viscosity less than about 1000 centipoise (cps), and
wherein the slurry has a 7-day pour test of 90% or greater, as measured by the 7-day 2nd pour out test.

10. The method of claim 9, wherein step c) and step d) are performed simultaneously.

11. The method of claim 9, wherein the method further comprises step e-i) if the viscosity of the slurry is above 600 cps, further processing the slurry until the viscosity of the slurry is less than 600 cps.

12. The method of claim 9, wherein the one or more additives is polyether polycarboxylate sodium salt.

13. The method of claim 9, wherein the one or more additives is an acrylic copolymer.

14. The method of claim 9, wherein the one or more additives is added to in the slurry at between about 0.001% to about 2.5% by weight (based on dry magnesium hydroxide solids).

15. The method of claim 9, wherein the one or more additives is added to the slurry at about 0.60% by weight (based on dry magnesium hydroxide solids).

16. The method of claim 9, wherein the magnesium hydroxide of step c) is a magnesium hydroxide powder, and wherein the magnesium hydroxide powder has a distribution of particles having a D50 between about 0.1 to about 20 microns.

17. The method of claim 9, wherein the magnesium hydroxide of step c) is a magnesium hydroxide powder, and wherein the magnesium hydroxide powder has distribution of particles having a BET surface area between about 5 about to 30 $m^2/g$.

18. The method of claim 9, wherein the one or more additives consists essentially of a combination of polyether polycarboxylate sodium salt and an acrylic copolymer.

19. A stable magnesium hydroxide slurry produced according to the method of claim 9.

* * * * *